US012722867B2

(12) United States Patent
Jaafour et al.

(10) Patent No.: US 12,722,867 B2
(45) Date of Patent: Sep. 1, 2026

(54) DETERGENT SUPPLY FORM

(71) Applicant: HENKEL AG & CO. KGAA, Düsseldorf (DE)

(72) Inventors: Marouane Jaafour, Willich (DE); Matthias Sunder, Düsseldorf (DE); Mareile Job, Leverkusen (DE); Arno Düffels, Düsseldorf (DE); Steffen Ristau, Düsseldorf (DE)

(73) Assignee: Henkel AG & Co. KGaA, Düseldorf (DE)

( * ) Notice: Subject to any disclaimer, the term of this patent is extended or adjusted under 35 U.S.C. 154(b) by 0 days.

(21) Appl. No.: 18/280,238

(22) PCT Filed: Feb. 3, 2022

(86) PCT No.: PCT/EP2022/052567
§ 371 (c)(1),
(2) Date: Sep. 3, 2023

(87) PCT Pub. No.: WO2022/184371
PCT Pub. Date: Sep. 9, 2022

(65) Prior Publication Data
US 2024/0067434 A1 Feb. 29, 2024

(30) Foreign Application Priority Data
Mar. 3, 2021 (EP) ..................................... 21160375

(51) Int. Cl.
*B65D 75/00* (2006.01)
*B65D 5/02* (2006.01)
(Continued)

(52) U.S. Cl.
CPC ............... *B65D 81/24* (2013.01); *B65D 5/02* (2013.01); *B65D 5/66* (2013.01); *B65D 75/002* (2013.01);
(Continued)

(58) Field of Classification Search
CPC ........ B65D 81/24; B65D 85/62; B65D 85/54; B65D 77/02; B65D 75/002; B65D 5/66; B65D 5/02; C11D 17/0047
(Continued)

(56) References Cited

U.S. PATENT DOCUMENTS 5,542,537 A * 8/1996 Ford .................... B65D 77/042 53/445
7,066,321 B2 * 6/2006 Kawaguchi .......... B65D 5/0227 206/524.1
2005/0241980 A1 11/2005 Schmitt et al.

FOREIGN PATENT DOCUMENTS

CN 109153949 * 1/2019
DE 10018003 A1 10/2001
(Continued)

OTHER PUBLICATIONS https://www.amazon.com/Simple-Scents-Australia-Moisturizing-Enriched/dp/B009P4L9B6/ref=asc_df_B009P4L9B6?tag=bingshoppinga-20&linkCode=df0&hvadid=80676855877545&hvnetw=o&hvqmt=e&hvbmt=be&hvdev=c&hvlocint=188&hvlocphy=&hvtargid=pla-4584276319617745&msclkid=b0cf0dbb3be61fbb20b0640b5120abf5&th=1 (Year: 2020).*

*Primary Examiner* — Rafael A Ortiz
(74) *Attorney, Agent, or Firm* — Blank Rome LLP

(57) ABSTRACT

A detergent supply form includes an outer packaging in the form of a folding box having a bottom surface, a top surface and side walls connecting the bottom surface and the top surface, and cuboid detergent shaped bodies having a lower face, an upper face and a lateral face connecting the lower face and the upper face. The outer packaging contains at least two detergent shaped bodies, which are in a sorted arrangement in the outer packaging. The outer packaging has a filling degree of 85 vol. % to 99 vol. %.

20 Claims, 3 Drawing Sheets

(51) Int. Cl.

*B65D 5/66* (2006.01)
*B65D 77/02* (2006.01)
*B65D 81/24* (2006.01)
*B65D 85/00* (2006.01)
*B65D 85/62* (2006.01)
*C11D 17/00* (2006.01)

(52) U.S. Cl.

CPC ............. *B65D 77/02* (2013.01); *B65D 85/54* (2013.01); *B65D 85/62* (2013.01); *C11D 17/0047* (2013.01)

(58) Field of Classification Search

USPC .......................................................... 206/499
See application file for complete search history.

(56) References Cited

FOREIGN PATENT DOCUMENTS

| | | | | | |
|---|---|---|---|---|---|
| DE | 10062582 | A1 | | 6/2002 | |
| EP | 0245759 | | * | 11/1987 | |
| WO | WO-0220361 | A1 | * | 3/2002 | ............. B65D 25/04 |
| WO | WO-0230786 | A1 | * | 4/2002 | ........... B65D 5/4237 |
| WO | WO-2004046297 | A1 | * | 6/2004 | ......... C11D 17/0078 |
| WO | 2004058580 | A1 | | 7/2004 | |
| WO | WO-2007025603 | A1 | * | 3/2007 | ............. B65D 77/02 |
| WO | WO-2017198567 | A1 | * | 11/2017 | ............... B65D 1/42 |
| WO | WO-2022238179 | A1 | * | 11/2022 | ............. B65D 25/14 |

* cited by examiner

DETERGENT SUPPLY FORM

CROSS-REFERENCE TO RELATED APPLICATIONS

This application is a National Stage of International Patent Application No. PCT/EP2022/052567, filed Feb. 3, 2022, which claims foreign priority to European Patent Application No. 21160375.8, filed Mar. 3, 2021, the disclosures of which are hereby incorporated by reference herein in their entireties.

FIELD OF THE INVENTION

The present invention relates to a detergent supply form comprising an outer packaging and detergent shaped bodies which are in a sorted arrangement in the outer packaging. In particular, the invention relates to detergent supply forms which have sorted detergent shaped bodies and outer packagings with high fill levels.

BACKGROUND

Continuously changing requirements are imposed on the forms of manufacture and supply of detergents and cleaning agents. The main focus has, for quite some time, been on the convenient metering of detergents and cleaning agents by the consumer and the simplification of the work steps necessary for carrying out a washing or cleaning method. One technical solution is provided by pre-portioned detergents or cleaning agents—for example, water-soluble containers having one or more receiving compartments for solid or liquid detergents or cleaning agents. A further technical solution is provided by detergent tablets which can be of single-phase or multi-phase design.

Not only water-soluble containers but also detergent tablets are generally hygroscopic due to the active substances included therein. To prevent water absorption, the pre-portioned detergent or cleaning agent dosing units are individually packaged by means of water-impermeable packaging means, for example flow packs based on water-insoluble polymer films. Alternatively, a plurality of detergent or cleaning agent dosing units can be assembled in a container which for its part has a water vapor barrier and in this way reduces water ingress into the dosing units.

Regardless of whether the packaging means used to reduce water ingress enclose individual detergent or cleaning agent dosing units or a plurality of detergent or cleaning agent dosing units, their use is not desirable for ecological reasons. One aim in the development of new types of detergent supply forms is therefore to provide packaging solutions and packaging forms which, on the basis of recycled or recyclable or biodegradable materials, realize as far as possible the technical advantages of biologically unrecycled or non-recyclable or non-biodegradable materials. A starting point for this development is offered by the optimization and development of already existing, sustainable technical solutions.

A technical problem which enjoys particular attention in relation to detergent or cleaning agent dosing units, in particular to detergent or cleaning agent tablets, is to ensure stability during the transportation and storage of these dosing units. The concept of transportation and storage stability covers not only the assurance of the physical stability of the detergent or cleaning agent dosing units, for example against breakage, but also the assurance of the chemical stability of the detergent or cleaning agent dosing units, for example against premature abreaction and disintegration of the 3D shape caused by abreaction. A classic approach to ensuring the transportation and storage stability of detergent or cleaning agent tablets consists in the packaging of these tablets by means of individual flow pack packaging with three-sided weld seams and the fin seams characteristic of these flow packs. These flow packs are generally produced from non-biodegradable water-insoluble polymer films and, in addition to the detergent or cleaning agent dosing unit, also enclose a considerable volume of air. Under mechanical stress, this air volume and the above-mentioned fin seams ensure the physical integrity of the dosing units due to their damping effect. In addition, the water-insoluble polymer films prevent an unwanted ingress of water from the ambient air and thus also chemically stabilize the detergent or cleaning agent dosing units.

SUMMARY OF THE INVENTION

Against the background of the prior art described above, it has been the object of the application to provide detergent portion units which can be produced by means of simplified methods, which have a high degree of transportation and storage stability and which can be put together in a simple manner using the smallest amounts of packaging materials. After all, the detergent portion units should have a high product performance and be easy and safe to handle for the consumer.

DETAILED DESCRIPTION

Figure 1:
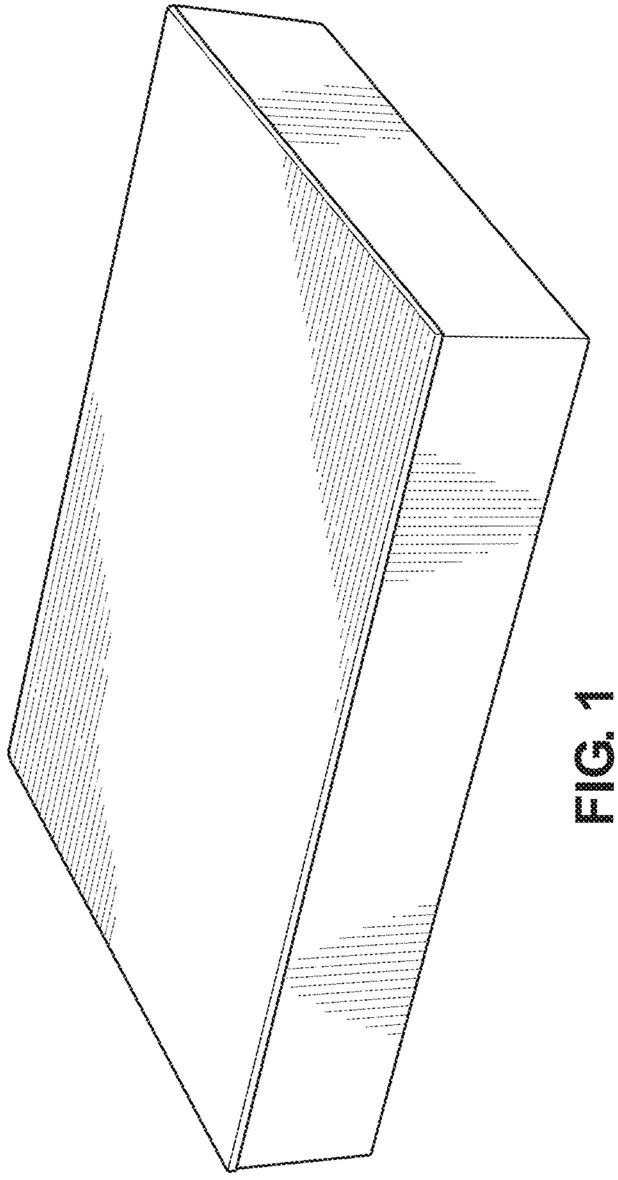
FIG. 1 illustrates an example of a closed outer packaging.
Figure 2:
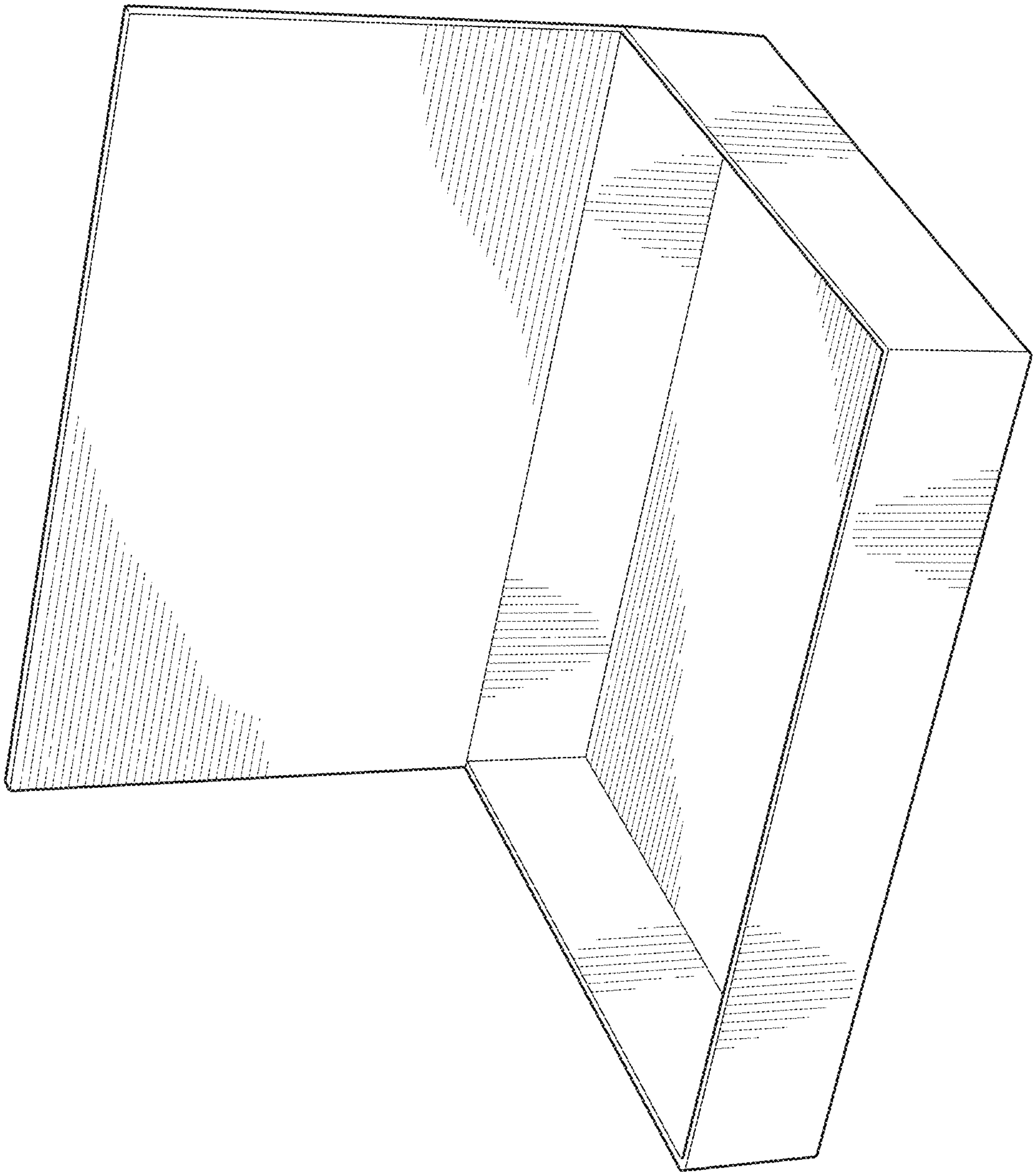
FIG. 2 illustrates an example of an open outer packaging.
Figure 3:
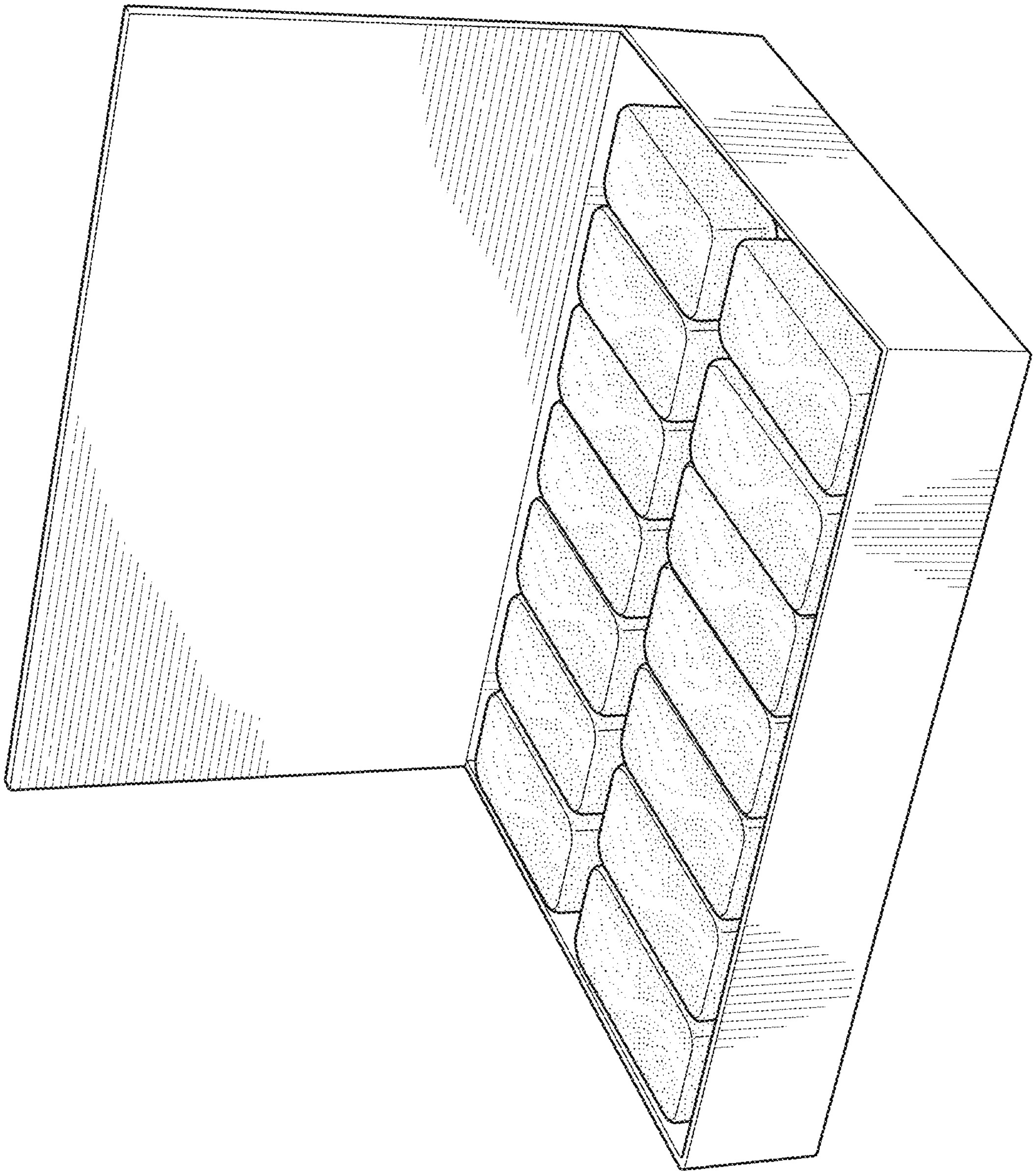
FIG. 3 illustrates an example of an open outer packaging including a plurality of cuboid detergent shaped bodies.

A detergent supply form, comprising the following, is suitable for achieving these objects:

a) an outer packaging in the form of a folding box, with a bottom surface, a top surface and side walls connecting the bottom surface and the top surface, b) cuboid detergent shaped bodies having a lower face, an upper face and a lateral face connecting the lower face and the upper face, wherein i) the outer packaging includes at least two detergent shaped bodies which are in a sorted arrangement in the outer packaging, and ii) the outer packaging has a fill level of 85% by volume to 99% by volume.

Surprisingly, it turns out that, in outer packagings with a high fill level, the sorting characterizing the subject-matter of the claim brings about an improvement in the storage and transportation stability of the shaped bodies.

The outer packaging is preferably designed as a single-piece folding box. Preferred outer packagings have a flat bottom surface the largest diagonal of which is greater than the height of the outer packaging. This design of the outer packaging increases its stability and enables simple opening and removal. It is particularly preferred if the outer packaging has a flat bottom surface the largest diagonal of which is more than twice, preferably more than four times the height of the outer packaging.

To achieve the high fill level, it has proven advantageous for the outer packaging to have an angular bottom surface, preferably a quadrilateral bottom surface, very particularly preferably a rectangular bottom surface. For the same reason and for improving the stackability of the outer packagings, it is preferred that the outer packaging has a top surface that is plane-parallel to the bottom surface. Outer packagings in cuboid form are particularly preferred.

For increasing storage stability, in particular the chemical stabilization of the detergent shaped bodies, it has proven advantageous for the outer packaging to be reclosable. Suitable closure elements are, for example, adhesive, latching, snapping or plug-in elements, wherein adhesive and plug-in elements are particularly preferred. Exemplary closure elements are plug-in closures or removable adhesive closures.

For reasons of sustainability, recycled and/or recyclable materials are preferred for the production of the outer packaging. The packaging materials are preferably based on renewable raw materials. The use of packaging materials based on pulp and waste paper is particularly preferred.

In a first preferred embodiment, the outer packaging is made of cardboard. In addition to its availability and recyclability, the advantages of cardboard lie in the great variability of available types and grammages. Preferred cardboards have a grammage of 150 to 400 $g/m^2$.

In a particularly preferred embodiment the corrugated cardboard which has proven to be technical superior to cardboard in some respects is used for manufacturing the outer packaging. Corrugated cardboard is characterized by a high strength with low net weight and is a suitable means for storage and transportation even in large containers.

In a particularly preferred embodiment, the outer packaging is designed as a hinged lid box.

An essential component of the detergent supply form according to the invention is the detergent shaped body. A “shaped body” is a single body that stabilizes itself in the shape imparted to it. This dimensionally stable body is formed from a molding compound (e.g., a composition) in such a way that this molding compound is deliberately brought into a prespecified shape, for example by pouring a liquid composition into a casting mold and then curing the liquid composition, or by compacting a particulate preliminary mixture, for example in the context of a tableting process.

Not only offer forms for textile washing but also offer forms for cleaning hard surfaces such as ceramics, glass, metal or tiles are referred to as detergent shaped bodies. Particularly preferred are detergent shaped bodies, in particular detergent shaped bodies for textile washing, since they are usually characterized by a comparatively low hardness due to the need for rapid disintegration in the washing liquor. The detergent shaped bodies preferably have a weight of 14 g to 42 g, preferably of 20 g to 38 g, in particular of 24 g to 34 g.

Due to their manufacturability and their properties relating to removal from the outer packaging, detergent shaped bodies which have a flat lower face, the largest diagonal of which is more than twice, preferably more than four times the height of the detergent shaped bodies, are preferred.

It is particularly preferred if the detergent shaped bodies are present as tablets or comprise tablets.

The cuboid detergent shaped bodies comprise a lower face, an upper face and a lateral face connecting the lower face and the upper face. It has also proven advantageous for the stability of the shaped bodies if the edges bounding the lower face and the upper face are chamfered. To increase the stability of the shaped bodies, it may also be appropriate to round off the edges of the lateral faces connecting the lower faces and the upper faces.

The density of preferred detergent shaped bodies is 1.1 $g/cm^3$ to 1.5 $g/cm^3$, preferably 1.15 $g/cm^3$ to 1.3 $g/cm^3$. As a consequence of the high density of the shaped bodies and the high fill level, the detergent supply forms according to the invention have comparatively high densities, for example densities in the range from 0.9 $g/cm^3$ to 1.4 $g/cm^3$, preferably in the range from 1.05 $g/cm^3$ to 1.3 $g/cm^3$.

Preferred detergent shaped bodies have a rough upper face or a rough lower face, the average roughness of which is from 25 μm to 1000 μm, preferably from 50 μm to 800 μm. Roughness describes the deviation of a real surface from an ideally smooth surface and is determined, for example, by means of confocal laser scanning microscopy.

The roughness values preferred according to the invention reduce abrasion of the shaped bodies during production and transportation and at the same time ensure sufficient adhesion of the shaped bodies to the material of the outer packaging and to the other shaped bodies located in the outer packaging, as a result of which they are stabilized within the outer packaging.

An essential feature of the detergent supply form according to the invention is its high fill level of 85 to 99% by volume of the outer packaging. This high fill level not only reduces the amount of packaging material that can be used for each detergent shaped body, but surprisingly also increases the physical stability of the detergent shaped bodies, not only with regard to fracturing of the shaped body but also with respect to abrasion of the shaped body. The fill level of preferred outer packagings is 88% by volume and 99% by volume, preferably 92% by volume and 99% by volume. The term “fill level” refers to that proportion of the internal volume of the outer packaging which is taken up by the detergent shaped bodies in the outer packaging.

In order to reduce the proportion of packaging per detergent shaped body, it is preferred if the detergent supply form comprises at least ten, preferably at least twenty, particularly preferably at least thirty detergent shaped bodies which are in a sorted arrangement in the outer packaging.

In the integration of a larger number of detergent shaped bodies into the detergent supply form, the stability of the shaped bodies can be further improved by a targeted arrangement of the shaped bodies. Detergent supply forms have proven to be advantageous which comprise at least ten, preferably at least twenty, particularly preferably at least thirty detergent shaped bodies which are in a sorted arrangement in the outer packaging such that each of the detergent shaped bodies is in direct contact with at least three other detergent shaped bodies.

As mentioned above, it was surprisingly possible to increase the storage and transportation stability of the detergent shaped bodies by their sorting in the outer packaging. In this context, it has been found that not only the chemical but also the physical stability of the detergent shaped bodies are influenced by the type of orientation of the detergent shaped bodies in the packaging.

Due to the suitable orientation of the cuboid detergent shaped bodies in outer packaging based on corrugated cardboard, adhesion of the shaped bodies to the surface of the cardboard can be increased and slippage of the shaped bodies during transportation and also the associated fracturing or abrasion of the shaped bodies can be prevented. In a preferred embodiment of the detergent supply form, the outer packaging is made of corrugated cardboard and the detergent shaped bodies have a cuboid geometry in which the diagonal of the lower face of the detergent shaped body is more than twice, preferably more than four times the height of the detergent shaped bodies, wherein the detergent shaped bodies are in a sorted arrangement in the outer packaging such that the longitudinal direction of detergent shaped bodies which are resting directly on the bottom surface of the outer packaging runs parallel to the corrugations of the corrugated cardboard.

The detergent shaped bodies can be oriented in the outer packaging such that the lower face of the detergent shaped bodies, which are resting directly on the bottom surface of the outer packaging, runs orthogonally to the bottom surface of the outer packaging. In order to improve the adhesion of the detergent shaped bodies, however, it has proven advantageous if detergent shaped bodies with a cuboid geometry, in which the diagonal of the lower face of the detergent shaped body is more than twice, preferably more than four times the height of the detergent shaped bodies, are in a sorted arrangement in the outer packaging made of corrugated cardboard such that the lower face of detergent shaped bodies which are resting directly on the bottom surface of the outer packaging runs plane-parallel to the bottom surface of the outer packaging and the longitudinal direction of detergent shaped bodies which are resting directly on the bottom surface of the outer packaging runs parallel to the corrugations of the corrugated cardboard.

At least in the closed state of the outer packaging, the transportation stability of the detergent shaped bodies can be further improved by their suitable orientation with respect to the structure of the top surface. Preferred detergent supply forms are therefore characterized in that the outer packaging is made of corrugated cardboard and the detergent shaped bodies have a cuboid geometry in which the diagonal of the lower face of the detergent shaped body is more than twice, preferably more than four times the height of the detergent shaped bodies, wherein the detergent shaped bodies are in a sorted arrangement in the outer packaging such that the longitudinal direction of detergent shaped bodies which, when the outer packaging is closed, are in direct contact with the top surface of the outer packaging runs parallel to the corrugations of the corrugated cardboard.

The detergent shaped bodies can be oriented in the outer packaging such that the upper face of detergent shaped bodies which, when the outer packaging is closed, are in direct contact with the top surface of the outer packaging, runs orthogonally to the top surface of the outer packaging. However, it has proven advantageous for adhesion if the outer packaging is made of corrugated cardboard and the detergent shaped bodies have a cuboid geometry, in which the diagonal of the lower face of the detergent shaped body is more than twice, preferably more than four times the height of the detergent shaped bodies, wherein the detergent shaped bodies are in a sorted arrangement in the outer packaging such that the lower face of detergent shaped bodies, which when the outer packaging is closed are in direct contact with the top surface of the outer packaging, runs plane-parallel to the top surface of the outer packaging, and the longitudinal direction of detergent shaped bodies, which when the outer packaging is closed are in direct contact with the top surface of the outer packaging, runs parallel to the corrugations of the corrugated cardboard.

To reduce water vapor permeability, the outer packaging can be equipped with a water-insoluble cover film, preferably a polyethylene cover film. While the reduction of water vapor ingress is ensured in a comparable manner by water-insoluble cover films on the outer face or the inner face of the outer packaging, it has proven advantageous for the adhesion of the detergent shaped bodies to the surface of the outer packaging if the outer packaging comprises a water-insoluble cover film, preferably a polyethylene cover film, which preferably covers the outer packaging over its entire surface on the inner side.

This effect can further be enhanced by the preparation of the detergent shaped bodies in film packaging. Detergent supply forms in which each of the detergent shaped bodies has a separate film packaging are particularly preferred.

If film packagings are used, film packagings made of a water-soluble film material are preferred. The water-soluble film material may comprise one or more structurally different water-soluble polymer(s). Suitable water-soluble polymer(s) are in particular polymers from the group of (optionally acetalized) polyvinyl alcohols (PVAL) and copolymers thereof.

Water-soluble films are preferably based on a polyvinyl alcohol or a polyvinyl alcohol copolymer of which the molecular weight lies within the range from 10 000 to 1 000 000 $gmol^{-1}$, preferably from 20 000 to 500 000 $gmol^{-1}$, particularly preferably from 30 000 to 100 000 $gmol^{-1}$ and in particular from 40 000 to 80 000 $gmol^{-1}$.

The production of the polyvinyl alcohol and polyvinyl alcohol copolymers generally includes the hydrolysis of intermediate polyvinyl acetate. Preferred polyvinyl alcohols and polyvinyl alcohol copolymers have a degree of hydrolysis of 70 to 100 mol. %, preferably 80 to 90 mol. %, particularly preferably 81 to 89 mol. %, and in particular 82 to 88 mol. %.

Preferred polyvinyl alcohol copolymers include, in addition to vinyl alcohol, an ethylenically unsaturated carboxylic acid, or the salt or ester thereof. In addition to vinyl alcohol, such polyvinyl alcohol copolymers particularly preferably include sulfonic acids, such as 2-acrylamido-2-methyl-1-propanesulfonic acid (AMPS), acrylic acid, methacrylic acid, acrylic esters, methacrylic esters or mixtures thereof; among the esters, preference is given to C1-4 alkyl esters or hydroxyalkyl esters. Ethylenically unsaturated dicarboxylic acids, for example itaconic acid, maleic acid, fumaric acid and mixtures thereof, are possible as further monomers.

Due to their availability, easy processability and biodegradability, film packagings are preferred which consist of at least 40% by weight, preferably at least 60% by weight and in particular at least 80% by weight of polyvinyl alcohol.

To increase the stability of the shaped bodies and to ensure a sufficient fill level in the outer packaging, it is preferred that the film packaging be shrunk onto the detergent shaped bodies.

In addition to physical stability and integrity, the targeted orientation of the cuboid detergent shaped bodies in outer packaging is also suitable for increasing the chemical stability of the shaped bodies. This effect relates in particular to detergent shaped bodies of high hygroscopicity or outer packaging with a high level of water vapor ingress. In corresponding detergent supply forms, the detergent shaped bodies tend to adhere to the surface of the outer packaging. During the detachment of adherent detergent shaped bodies from the inner face of the outer packaging, shaped bodies can then break.

To prevent adhesion, a detergent supply form has proven advantageous in which the outer packaging is made of corrugated cardboard and the detergent shaped bodies have a cuboid geometry in which the diagonal of the lower face of the detergent shaped body is more than twice, preferably more than four times the height of the detergent shaped bodies, wherein the detergent shaped bodies are in a sorted arrangement in the outer packaging such that the longitudinal direction of detergent shaped bodies which are resting directly on the bottom surface of the outer packaging runs orthogonally to the corrugations of the corrugated cardboard.

In the context of this embodiment, the alignment of the detergent shaped bodies in the outer packaging can be effected in such a way that the longitudinal direction of the detergent shaped bodies which are resting directly on the bottom surface of the outer packaging runs orthogonally to the corrugations of the corrugated cardboard. Due to the reduced tendency to adhere, it is however preferred for the cuboid detergent shaped bodies to be in a sorted arrangement in the outer packaging made of corrugated cardboard such that the lower face of detergent shaped bodies which are resting directly on the bottom surface of the outer packaging runs orthogonally to the bottom surface of the outer packaging and the longitudinal direction of detergent shaped bodies which are resting directly on the bottom surface of the outer packaging runs orthogonally to the corrugations of the corrugated cardboard.

Adhesions can also occur between the detergent shaped body and the top surface of the outer packaging even if to a lesser extent than in the case of the bottom surface of the outer packaging. This can be the case in particular with very long storage times. To avoid these adhesions, a detergent supply form is advantageous in which the outer packaging is made of corrugated cardboard and the detergent shaped bodies have a cuboid geometry in which the diagonal of the lower face of the detergent shaped body is more than twice, preferably more than four times the height of the detergent shaped bodies, wherein the detergent shaped bodies are in a sorted arrangement in the outer packaging such that the longitudinal direction of detergent shaped bodies which are in direct contact with the top surface of the outer packaging when the outer packaging is closed runs orthogonally to the corrugations of the corrugated cardboard.

In this embodiment, the orientation of the detergent shaped bodies can be effected in such a way that the longitudinal direction of the detergent shaped bodies which are resting directly on the bottom surface of the outer packaging runs orthogonally to the corrugations of the corrugated cardboard. Alternative detergent supply forms comprise an outer packaging made of corrugated cardboard and cuboid detergent shaped bodies, in which the diagonal of their lower face is more than twice, preferably more than four times their height, wherein the detergent shaped bodies are in a sorted arrangement in the outer packaging such that the upper face of the detergent shaped bodies, which, when the outer packaging is closed, is in direct contact with the top surface of the outer packaging, runs orthogonally to the top surface of the outer packaging and the longitudinal direction of the detergent shaped bodies which, when the outer packaging is closed, are in direct contact with the top surface of the outer packaging runs orthogonally to the corrugations of the corrugated cardboard.

To reduce the tendency of the detergent shaped bodies to adhere, the outer packaging has no water-insoluble cover film on its inner side. A further reduction in adhesion can be achieved if the detergent shaped bodies do not have a separate film packaging, in particular no film packaging made of a water-soluble film material.

To improve water vapor ingress properties, the outer packaging can comprise a water-insoluble cover film, preferably a polyethylene cover film, which covers the outer packaging on its outer face, preferably over the entire surface.

Despite the technical advantages listed above, it may be preferred for reasons of sustainable production and packaging of the detergent shaped bodies if the outer packaging does not comprise any water-insoluble cover film. Particularly suitable for the detergent shaped bodies, which are particularly preferably suitable for packaging in the detergent supply forms according to the invention, are in particular detergent shaped bodies which have a water absorption (2 weeks, 35° C., 80% relative humidity) above 20 mg/g, preferably above 30 mg/g.

Also suitable for packaging in the detergent supply forms are detergent shaped bodies which have a volume expansion (2 weeks, 35° C., 80% relative humidity) above 5% by volume, preferably above 7% by volume and in particular from 8% by volume to 18% by volume. This type of increase in volume can be observed, for example, in detergent shaped bodies which contain a disintegration aid, in particular a polymeric disintegration aid, for example a disintegration aid based on polyvinylpyrrolidone or cellulose.

In summary, the following items, among others, are provided by this application:

1. Detergent supply form, comprising
   a) an outer packaging in the form of a folding box, with a bottom surface, a top surface and side walls connecting the bottom surface and the top surface,
   b) cuboid detergent shaped bodies having a lower face, an upper face and a lateral face connecting the lower face and the upper face, wherein
      i) the outer packaging includes at least two detergent shaped bodies which are in a sorted arrangement in the outer packaging, and
      ii) the outer packaging has a fill level of 85% by volume to 99% by volume.
2. Detergent supply form according to Point 1, wherein the outer packaging has a flat bottom surface the largest diagonal of which is greater than the height of the outer packaging.
3. Detergent supply form according to any one of the preceding points, wherein the outer packaging has a flat bottom surface the largest diagonal of which is more than twice, preferably more than four times the height of the outer packaging.
4. Detergent supply form according to any one of the preceding points, wherein the outer packaging has an angular bottom surface, preferably a quadrilateral bottom surface, very particularly preferably a rectangular bottom surface.
5. Detergent supply form according to any one of the preceding points, wherein the outer packaging has a top surface parallel to the bottom surface.
6. Detergent supply form according to any one of the preceding points, wherein the outer packaging has a cuboid shape.
7. Detergent supply form according to any one of the preceding points, wherein the outer packaging can be reclosed.
8. Detergent supply form according to any one of the preceding points, wherein the detergent shaped body has a weight of 14 g to 42 g, preferably of 20 g to 38 g, in particular of 24 g to 34 g.
9. Detergent supply form according to any one of the preceding points, wherein the detergent shaped bodies are present as tablets or comprise tablets.
10. Detergent supply form according to any one of the preceding points, wherein the detergent shaped bodies have a flat lower face, the largest diagonal of which is more than twice, preferably more than four times the height of the detergent shaped bodies.

11. Detergent supply form according to any one of the preceding points, comprising cuboid detergent tablets with a lower face, an upper face and a lateral faces connecting the lower face and the upper face, wherein the edges bounding the lower face and the upper face are chamfered.
12. Detergent supply form according to any one of the preceding points, comprising cuboid detergent tablets with a lower face, an upper face and a lateral face connecting the lower face and the upper face, wherein the edges of the lateral surfaces connecting the lower sides and the upper sides are rounded.
13. Detergent supply form according to any one of the preceding points, wherein the detergent supply form comprises at least ten, preferably at least twenty, particularly preferably at least thirty, detergent shaped bodies which are in a sorted arrangement in the outer packaging.
14. Detergent supply form according to any one of the preceding points, wherein the detergent supply form comprises at least ten, preferably at least twenty, particularly preferably at least thirty, detergent shaped bodies which are in a sorted arrangement in the outer packaging such that each of the detergent shaped bodies is in direct contact with at least three other shaped bodies.
15. Detergent supply form according to any one of the preceding points, wherein the detergent shaped bodies have a density of 1.1 g/cm$^3$ to 1.5 g/cm$^3$, preferably of 1.15 g/cm$^3$ to 1.3 g/cm$^3$.
16. Detergent supply form according to any one of the preceding points, wherein the detergent shaped bodies have a rough upper face or a rough lower face, the average roughness of which is from 25 μm to 1000 μm, preferably from 50 μm to 800 μm.
17. Detergent supply form according to any one of the preceding points, wherein the particles have a fill level of 88% by volume to 99% by volume, preferably 92% by volume to 99% by volume.
18. Detergent supply form according to any one of the preceding points, wherein the outer packaging is made of cardboard.
19. Detergent supply form according to any one of the preceding points, wherein the outer packaging is made of corrugated cardboard.
20. Detergent supply form according to any one of the preceding points, wherein the outer packaging is designed as a hinged lid box.
21. Detergent supply form according to any one of the preceding points, wherein the outer packaging comprises a water-insoluble cover film, preferably a polyethylene cover film.
22. Detergent supply form according to any one of the preceding points, wherein the outer packaging comprises a water-insoluble cover film, preferably a polyethylene cover film, which preferably covers the outer packaging over its entire surface on its inner side.
23. Detergent supply form according to any one of the preceding points, wherein
    - the outer packaging is made of corrugated cardboard and
    - the detergent shaped bodies have a cuboid geometry in which the diagonal of the lower face of the detergent shaped body is more than twice, preferably more than four times the height of the detergent shaped bodies, wherein the detergent shaped bodies are in a sorted arrangement in the outer packaging such that the longitudinal direction of the detergent shaped bodies which are resting directly on the bottom surface of the outer packaging run parallel to the corrugations of the corrugated cardboard.
24. Detergent supply form according to any one of the preceding points,
    - the outer packaging of which is made of corrugated cardboard and
    - the detergent shaped body of which has a cuboid geometry in which the diagonal of the lower face of the detergent shaped body is more than twice, preferably more than four times the height of the detergent shaped bodies, wherein
    - the detergent shaped bodies are in a sorted arrangement in the outer packaging such that
        - i) the lower face of detergent shaped bodies, which are resting directly on the bottom surface of the outer packaging, runs orthogonally to the bottom surface of the outer packaging, and
        - ii) the longitudinal direction of the detergent shaped bodies, which are resting directly on the bottom surface of the outer packaging, runs parallel to the corrugations of the corrugated cardboard.
25. Detergent supply form according to any one of the preceding points,
    - the outer packaging of which is made of corrugated cardboard and
    - the detergent shaped body of which has a cuboid geometry in which the diagonal of the lower face of the detergent shaped body is more than twice, preferably more than four times the height of the detergent shaped bodies, and
    - the detergent shaped bodies of which are in a sorted arrangement in the outer packaging such that
        - i) the lower face of the detergent shaped bodies, which are resting directly on the bottom surface of the outer packaging, runs plane-parallel to the bottom surface of the outer packaging, and
        - ii) the longitudinal direction of the detergent shaped bodies, which are resting directly on the bottom surface of the outer packaging, runs parallel to the corrugations of the corrugated cardboard.
26. Detergent supply form according to any one of the preceding points, wherein
    - the outer packaging is made of corrugated cardboard and
    - the detergent shaped bodies have a cuboid geometry in which the diagonal of the lower face of the detergent shaped body is more than twice, preferably more than four times the height of the detergent shaped bodies, wherein the detergent shaped bodies are in a sorted arrangement in the outer packaging such that the longitudinal direction of the detergent shaped bodies, which when the outer packaging is closed are in direct contact with the top surface of the outer packaging, runs parallel to the corrugations of the corrugated cardboard.
27. Detergent supply form according to any one of the preceding points,
    - the outer packaging of which is made of corrugated cardboard and
    - the detergent shaped body of which has a cuboid geometry in which the diagonal of the lower face of the detergent shaped body is more than twice, preferably more than four times the height of the detergent shaped bodies, wherein the detergent shaped bodies are in a sorted arrangement in the outer packaging such that i) the upper face of the detergent shaped bodies which, when the outer packaging is closed, are in direct contact with the top surface of the outer packaging, runs orthogonally to the top surface of the outer packaging, and ii) the longitudinal direction of the detergent shaped bodies which, when the outer packaging is closed, are in direct contact with the top surface of the outer packaging, runs parallel to the corrugations of the corrugated cardboard.

28. Detergent supply form according to any one of the preceding points, the outer packaging of which is made of corrugated cardboard and the detergent shaped body of which has a cuboid geometry in which the diagonal of the lower face of the detergent shaped body is more than twice, preferably more than four times the height of the detergent shaped bodies, wherein the detergent shaped bodies are in a sorted arrangement in the outer packaging such that i) the lower face of the detergent shaped bodies which, when the outer packaging is closed, are in direct contact with the top surface of the outer packaging, runs plane-parallel to the top surface of the outer packaging, and ii) the longitudinal direction of the detergent shaped bodies which, when the outer packaging is closed, are in direct contact with the top surface of the outer packaging, runs parallel to the corrugations of the corrugated cardboard.

29. Detergent supply form according to any one of the preceding points, wherein the detergent shaped bodies have a film packaging.

30. Detergent supply form according to any one of the preceding points, wherein each of the detergent shaped bodies has a separate film packaging.

31. Detergent supply form according to any one of the preceding points, wherein the detergent shaped bodies have a film packaging made of a water-soluble film material.

32. Detergent supply form according to any one of the preceding points, wherein the detergent shaped bodies have a film packaging which consists of polyvinyl alcohol of at least 40% by weight, preferably at least 60% by weight, and in particular at least 80% by weight.

33. Detergent supply form according to any one of the preceding points, wherein the detergent shaped bodies have a film packaging which is shrunk onto the detergent shaped body.

34. Detergent supply form according to any one of the preceding points, wherein the outer packaging comprises a water-insoluble cover film, preferably a polyethylene cover film, which covers the outer packaging on its outer side, preferably over the entire surface.

35. Detergent supply form according to any one of the preceding points, wherein the outer packaging does not comprise any water-insoluble cover film on its inner side.

36. Detergent supply form according to any one of the preceding points, wherein the outer packaging is made of corrugated cardboard and the detergent shaped bodies have a cuboid geometry in which the diagonal of the lower face of the detergent shaped body is more than twice, preferably more than four times the height of the detergent shaped bodies, wherein the detergent shaped bodies are in a sorted arrangement in the outer packaging such that the longitudinal direction of the detergent shaped bodies which are resting directly on the bottom surface of the outer packaging run orthogonally to the corrugations of the corrugated cardboard.

37. Detergent supply form according to any one of the preceding points, the outer packaging of which is made of corrugated cardboard and the detergent shaped body of which has a cuboid geometry in which the diagonal of the lower face of the detergent shaped body is more than twice, preferably more than four times the height of the detergent shaped bodies, wherein the detergent shaped bodies are in a sorted arrangement in the outer packaging such that i) the lower face of the detergent shaped bodies, which are resting directly on the bottom surface of the outer packaging, runs plane-parallel to the bottom surface of the outer packaging, and ii) the longitudinal direction of the detergent shaped bodies, which are resting directly on the bottom surface of the outer packaging, runs orthogonally to the corrugations of the corrugated cardboard.

38. Detergent supply form according to any one of the preceding points, the outer packaging of which is made of corrugated cardboard and the detergent shaped body of which has a cuboid geometry in which the diagonal of the lower face of the detergent shaped body is more than twice, preferably more than four times the height of the detergent shaped bodies, wherein the detergent shaped bodies are in a sorted arrangement in the outer packaging such that i) the lower face of detergent shaped bodies, which are resting directly on the bottom surface of the outer packaging, runs orthogonally to the bottom surface of the outer packaging, and ii) the longitudinal direction of the detergent shaped bodies, which are resting directly on the bottom surface of the outer packaging, runs orthogonally to the corrugations of the corrugated cardboard.

39. Detergent supply form according to any one of the preceding points, wherein the outer packaging is made of corrugated cardboard and the detergent shaped bodies have a cuboid geometry in which the diagonal of the lower face of the detergent shaped body is more than twice, preferably more than four times the height of the detergent shaped bodies, wherein the detergent shaped bodies are in a sorted arrangement in the outer packaging such that the longitudinal direction of the detergent shaped bodies, which in the closed outer packaging are in direct contact with the top surface of the outer packaging, runs orthogonally to the corrugations of the corrugated cardboard.

40. Detergent supply form according to any one of the preceding points, the outer packaging of which is made of corrugated cardboard and the detergent shaped body of which has a cuboid geometry in which the diagonal of the lower face of the detergent shaped body is more than twice, preferably more than four times the height of the detergent shaped bodies, wherein the detergent shaped bodies are in a sorted arrangement in the outer packaging such that i) the upper face of the detergent shaped bodies which, when the outer packaging is closed, are in direct contact with the top surface of the outer packaging, runs plane-parallel to the top surface of the outer packaging, and ii) the longitudinal direction of the detergent shaped bodies, which are resting directly on the bottom surface of the outer packaging, runs orthogonally to the corrugations of the corrugated cardboard.

41. Detergent supply form according to any one of the preceding points, the outer packaging of which is made of corrugated cardboard and the detergent shaped body of which has a cuboid geometry in which the diagonal of the lower face of the detergent shaped body is more than twice, preferably more than four times the height of the detergent shaped bodies, wherein the detergent shaped bodies are in a sorted arrangement in the outer packaging such that i) the upper face of the detergent shaped bodies which, when the outer packaging is closed, are in direct contact with the top surface of the outer packaging, runs orthogonally to the top surface of the outer packaging, and ii) the longitudinal direction of the detergent shaped bodies which, when the outer packaging is closed, are in direct contact with the top surface of the outer packaging, runs orthogonally to the corrugations of the corrugated cardboard.

42. Detergent supply form according to any one of the preceding points, wherein the detergent shaped bodies have no film packaging.

43. Detergent supply form according to any one of the preceding points, wherein the detergent shaped bodies have a water absorption (2 weeks, 35° C., 80% relative humidity) above 20 mg/g, preferably above 30 mg/g.

44. Detergent supply form according to any one of the preceding points, wherein the detergent shaped bodies have a volume expansion (2 weeks, 35° C., 80% relative humidity) above 5% by volume, preferably above 7% by volume and in particular from 8% by volume to 18% by volume.

45. Detergent supply form according to any one of the preceding points, wherein the detergent shaped bodies contain a disintegration aid, in particular a polymeric disintegration aid, for example a disintegration aid based on polyvinylpyrrolidone or cellulose.

EXAMPLES

The adhesion behavior of detergent tablets on corrugated cardboard was investigated. For this purpose, the corrugated board to be examined is fastened flat on the horizontally aligned main platform of a friction measuring device. A detergent tablet (length 6.7 cm, width 2.5 cm, height 1.5 cm, weight 29 g) is placed on the cardboard surface, at one end of which tablet a small metal body is attached, which allows the tablet to be held by means of a magnet.

The main platform of the friction measuring device is then tilted out of the horizontal and the angle to the horizontal is determined at which the tablet detaches from the magnet (each of the measurements was carried out 3 times and the mean value of the measured values was formed). The results of the measurement are shown in the tables below.

| Direction of corrugations of the corrugated cardboard | Coating of the corrugated cardboard | Support surface of the tablet | Coating of the tablet | Detachment angle |
|---|---|---|---|---|
| Parallel to the slide direction of the tablet | PE cover film | Lower face with the longitudinal direction of the tablet in the direction of sliding | Shrunk-on PVA film | 45° |
| Orthogonally to the slide direction of the tablet | PE cover film | Lower side with the longitudinal direction of the tablet in the direction of sliding | Shrunk-on PVA film | 42° |

| Direction of corrugations of the corrugated cardboard | Coating of the corrugated cardboard | Support surface of the tablet | Coating of the tablet | Detachment angle |
|---|---|---|---|---|
| Parallel to the slide direction of the tablet | None | Lower side with the longitudinal direction of the tablet in the sliding direction | Shrunk-on PVA film | 35° |
| Orthogonally to the slide direction of the tablet | None | Lower side with the longitudinal direction of the tablet in the direction of sliding | Shrunk-on PVA film | 32° |

| Direction of corrugations of the corrugated cardboard | Coating of the corrugated cardboard | Support surface of the tablet | Coating of the tablet | Detachment angle |
|---|---|---|---|---|
| Parallel to the slide direction of the tablet | PE cover film | Lower side with the longitudinal direction of the tablet in the direction of sliding | None | 24° |
| Parallel to the slide direction of the tablet | None | Lower side with the longitudinal direction of the tablet in the sliding direction | None | 16° |

The invention claimed is:

1. A detergent supply form, comprising:

an outer packaging having a bottom surface, a top surface, and side walls connecting the bottom surface and the top surface; and a plurality of cuboid detergent shaped bodies in a sorted arrangement within the outer packaging, wherein:

each of the plurality of cuboid detergent shaped bodies has a flat lower face, an upper face, and a lateral face connecting the flat lower face and the upper face, a diagonal of the flat lower face is more than twice a height of the lateral face, the flat lower face of each of the plurality of cuboid detergent shaped bodies rests directly on and plane-parallel to the bottom surface of the outer packaging, the plurality of cuboid detergent shaped bodies are not covered by a film, the flat lower face has an average roughness of from 25 μm to 1000 μm, and the plurality of cuboid detergent shaped bodies fill from 85% by volume to 99% by volume of the volume of the outer packaging, based on the total volume of the outer packaging.

2. The detergent supply form according to claim 1, wherein the plurality of cuboid detergent shaped bodies fill from 88% by volume to 99% by volume of the volume of the outer packaging, based on the total volume of the outer packaging.

3. The detergent supply form of claim 1, wherein the outer packaging is made of corrugated cardboard.

4. The detergent supply form of claim 1, wherein the outer packaging comprises a water-insoluble cover film covering an inner surface of the bottom surface, the top surface, and the side walls.

5. The detergent supply form of claim 1, wherein the outer packaging does not comprise a water-insoluble cover film covering an inner surface of the bottom surface, the top surface, and the side walls.

6. The detergent supply form of claim 1, wherein the diagonal of the flat lower face is more than four times the height of the lateral face.

7. The detergent supply form according to claim 2, wherein the plurality of cuboid detergent shaped bodies fill from 92% by volume to 99% by volume of the volume of the outer packaging, based on the total volume of the outer packaging.

8. The detergent supply form of claim 4, wherein the water-insoluble cover film covers an entirety of the inner surface of the bottom surface, the top surface, and the side walls.

9. The detergent supply form of claim 4, wherein the water-insoluble cover comprises polyethylene.

10. The detergent supply form of claim 1, wherein the outer packaging is in the form of a hinged lid box.

11. The detergent supply form of claim 1, wherein the plurality of cuboid detergent shaped bodies have a water absorption of over 20 mg/g at 2 weeks, 35° C., and 80% relative humidity.

12. The detergent supply form of claim 11, wherein the plurality of cuboid detergent shaped bodies have a water absorption of over 30 mg/g at 2 weeks, 35° C., and 80% relative humidity.

13. The detergent supply form of claim 1, wherein the plurality of cuboid detergent shaped bodies have a volume expansion of over 5 vol % at 2 weeks, 35° C., and 80% relative humidity.

14. The detergent supply form of claim 1, wherein the flat lower face has an average roughness of from 50 μm to 800 μm.

15. The detergent supply form of claim 1, wherein the outer packaging has a cuboid shape.

16. The detergent supply form of claim 1, wherein the edges of the lateral face are rounded.

17. The detergent supply form of claim 1, wherein the plurality of cuboid detergent shaped bodies have a density of from 1.1 g/cm$^3$ to 1.5 g/cm$^3$.

18. The detergent supply form of claim 1, wherein the outer packaging contains at least thirty cuboid detergent shaped bodies in the sorted arrangement.

19. A detergent supply form, comprising:

an outer packaging having a bottom surface, a top surface, and side walls connecting the bottom surface and the top surface; and a plurality of cuboid detergent shaped bodies in a sorted arrangement within the outer packaging, wherein:

each of the plurality of cuboid detergent shaped bodies has a flat lower face, an upper face, and a lateral face connecting the flat lower face and the upper face, a diagonal of the flat lower face is more than twice a height of the lateral face, the flat lower face of each of the plurality of cuboid detergent shaped bodies rests directly on and plane-parallel to the bottom surface of the outer packaging, the plurality of cuboid detergent shaped bodies are not covered by a film, the plurality of cuboid detergent shaped bodies have a water absorption of over 20 mg/g at 2 weeks, 35° C., and 80% relative humidity, and the plurality of cuboid detergent shaped bodies fill from 85% by volume to 99% by volume of the volume of the outer packaging, based on the total volume of the outer packaging.

20. A detergent supply form, comprising:

an outer packaging having a bottom surface, a top surface, and side walls connecting the bottom surface and the top surface; and a plurality of cuboid detergent shaped bodies in a sorted arrangement within the outer packaging, wherein:

each of the plurality of cuboid detergent shaped bodies has a flat lower face, an upper face, and a lateral face connecting the flat lower face and the upper face, a diagonal of the flat lower face is more than twice a height of the lateral face, the flat lower face of each of the plurality of cuboid detergent shaped bodies rests directly on and plane-parallel to the bottom surface of the outer packaging, the plurality of cuboid detergent shaped bodies are not covered by a film, the plurality of cuboid detergent shaped bodies have a density of from 1.1 g/cm$^3$ to 1.5 g/cm$^3$, and the plurality of cuboid detergent shaped bodies fill from 85% by volume to 99% by volume of the volume of the outer packaging, based on the total volume of the outer packaging.

* * * * *